(12) United States Patent
Goodfellow

(10) Patent No.: US 6,923,371 B2
(45) Date of Patent: Aug. 2, 2005

(54) AUTHORIZATION CODE

(75) Inventor: Janet E. Goodfellow, Perth (GB)

(73) Assignee: NCR Corporation, Dayton, OH (US)

( * ) Notice: Subject to any disclaimer, the term of this patent is extended or adjusted under 35 U.S.C. 154(b) by 11 days.

(21) Appl. No.: 10/455,289

(22) Filed: Jun. 5, 2003

(65) Prior Publication Data
US 2004/0004118 A1 Jan. 8, 2004

(30) Foreign Application Priority Data
Jul. 3, 2002 (GB) .............................................. 0215316

(51) Int. Cl.[7] .............................................. G06K 5/00
(52) U.S. Cl. .................... 235/382; 235/380; 235/382.5; 705/72
(58) Field of Search ................ 235/380, 382, 235/382.5, 379; 705/43, 72; 702/8; 902/8, 22

(56) References Cited

U.S. PATENT DOCUMENTS 5,731,575 A * 3/1998 Zingher et al. ............. 235/379
6,032,859 A * 3/2000 Muehlberger et al. ...... 235/449
6,149,055 A   11/2000 Gatto
6,149,057 A   11/2000 Hollis
6,189,787 B1 * 2/2001 Dorf ........................... 235/380
6,360,209 B1 * 3/2002 Loeb et al. .................... 705/34
6,678,666 B1 * 1/2004 Boulware ..................... 705/66
2001/0032878 A1 * 10/2001 Tsiounis et al. ............ 235/379

FOREIGN PATENT DOCUMENTS

EP    0 717 381 A1    6/1996
EP    0 935 224 A2    8/1999

* cited by examiner

Primary Examiner—Diane I. Lee
Assistant Examiner—Seung H Lee
(74) Attorney, Agent, or Firm—Michael Chan

(57) ABSTRACT

An authorization code (70) for gaining access to a secure device (10) is described. The device may be an ATM. The authorization code (70) comprises a sequence of characters, which may be digits, letters, or special characters, and the code (70) includes an identification field (70*a*) for identifying or verifying the identity of a user, and a transaction field (70*b*) for indicating an amount of money to be transacted. Use of this authorization code (70) enables a transaction to be executed by solely by entering the authorization code (70), without a user having to navigate through a sequence of screens or other prompts.

7 Claims, 3 Drawing Sheets

AUTHORIZATION CODE

BACKGROUND OF THE INVENTION

The present invention relates to an authorization code for use with a secure access device. In particular, the invention relates to an authorization code for use with a self-service terminal (SST), such as an automated teller machine (ATM). The invention also relates to a secure access device implementing an authorization code to allow a user to execute a transaction.

ATMs are public access terminals that provide users with a secure, reliable, and convenient source of cash and other financial transactions in an unattended environment.

It is common for ATMs to provide users with a plurality of transaction types, including some of the following: cash withdrawal, bill payment, cash deposit, check deposit, funds transfer, check cashing, and such like. However, the most common transaction is cash withdrawal.

Many users would like to execute a cash withdrawal transaction in the shortest possible time, typically because the users are in a hurry, or because of perceived security risks in the vicinity of the ATM. Security risks may be a particular problem at certain times of a day (for example, at night) or in certain locations (for example, quiet, poorly lit side-streets).

To execute a cash withdrawal transaction at an ATM, a user typically navigates through a series of screens. The first screen is typically a PIN (personal identification number) entry screen where the user is invited to enter his/her authorization code in the form of a sequence of numbers.

The next screen is typically a transaction option screen where the user is invited to select a transaction type, for example, cash withdrawal.

The next screen typically lists pre-set transaction amounts and invites the user to select an amount.

If a pre-set transaction amount is selected, a transaction screen notifies the user that the transaction is pending, the next screen typically invites the user to remove his/her card, and another screen invites the user to remove the dispensed cash.

It takes time to navigate through these screens, which increases the length of time to execute a cash withdrawal transaction. This extended time period in which the user is in front of the ATM may cause the user to feel vulnerable to attack or fraud.

SUMMARY OF THE INVENTION

It is among the objects of an embodiment of the present invention to obviate or mitigate the above disadvantage or other disadvantages associated with prior art secure access devices.

According to a first aspect of the present invention there is provided an authorization code for gaining access to a secure device, the code comprising a sequence of characters, characterized in that the code includes an identification field and a transaction field, whereby a transaction can be executed by entering the authorization code.

Preferably, the identification field is the first part of the code, and the transaction field is the last part of the code.

Preferably, the transaction field relates to a cash withdrawal transaction. Alternatively, the transaction field may relate to a cash and/or check deposit transaction. In other embodiments, the transaction field may relate to a different type of transaction, for example, a bill payment transaction.

In a preferred embodiment, the first four characters are digits forming a personal identification number for the user, and the last three characters are digits that indicate the amount of money to be withdrawn in a local currency. However, it will be appreciated that in some countries more than three digits may be required to indicate the amount of money to be withdrawn.

In one embodiment, the user may be invited to confirm the amount to be withdrawn; whereas, in other embodiments, the transaction may proceed directly to an authorization stage without a confirmation screen being presented to the user.

It will be appreciated that this aspect of the present invention has the advantage that a single code can be entered that performs the functions of identifying or verifying the identity of a user, and indicating the value of a transaction. When implemented by an ATM, this enables a user to enter his/her PIN and the amount of cash to be withdrawn in a single operation, so that once a user enters his/her authorization code, the ATM can proceed directly to the authorization stage. Thus, a transaction can be executed solely by entering the authorization code.

According to a second aspect of the present invention there is provided a method of providing access to a secure device, the method comprising the steps of: receiving an authorization code comprising an identification field and a transaction field; operating on the identification field to recognize the user; and operating on the transaction field to authorize a transaction for an amount indicated by the transaction field; whereby, a user is able to execute a transaction by entering a single authorization code.

According to a third aspect of the present invention there is provided a secure device for executing transactions, the device being characterized by processing means for receiving an authorization code, and for parsing the authorization code into an identification field and a transaction field, so that a user may execute a transaction by entering a single authorization code.

The secure device may be a networked computing device, such as a self-service terminal (SST). The SST may be an information kiosk, an ATM, or such like.

According to a fourth aspect of the present invention there is provided a network of secure devices for executing transactions, characterized in that the network is operable to authorize a transaction from a single character sequence entered by a user at one of the secure devices.

According to a fifth aspect of the present invention there is provided an encrypting keypad for use with a secure device, the keypad including secure processing means for receiving an authorization code, and for parsing the authorization code into an identification field and a transaction field, for sending to a transaction authorization server.

The transaction authorization server may be a remote transaction host.

BRIEF DESCRIPTION OF THE DRAWINGS

These and other aspects of the present invention will be apparent from the following specific description, given by way of example, with reference to the accompanying drawings, in which.

DETAILED DESCRIPTION

Figure 1:
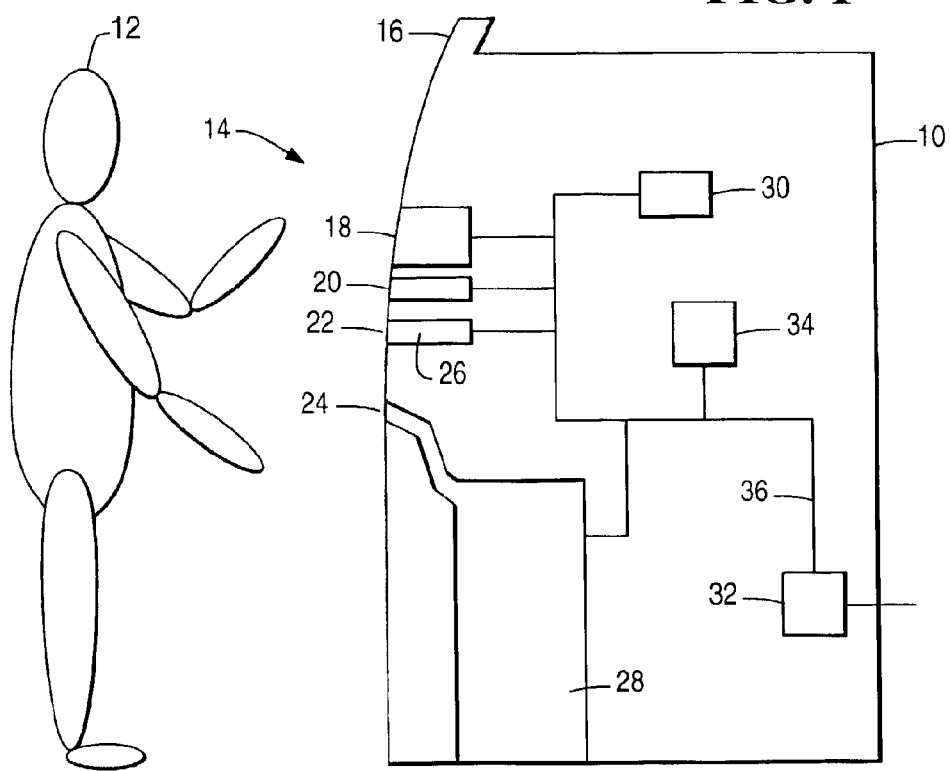
FIG. 1 is a schematic diagram of a user beside a self-service terminal according to one embodiment of the present invention.

Reference is now made to FIG. 1, which illustrates a secure access device 10 (in the form of an ATM) according to one embodiment of the present invention, being operated by a user 12 who is executing a transaction. The ATM is part of an ATM network (not shown) that includes a plurality of ATMs and a remote authorization host (not shown) for authorizing transactions.

The ATM 10 includes a user interface 14 for outputting information to the user 12 and for allowing the user 12 to input information to the ATM 10.

The user interface 14 is incorporated into a pivotably mounted molded fascia 16, and comprises a display module 18, an encrypting keypad module 20, a card slot 22, and a cash delivery slot 24. The card slot 22 aligns with a motorized card reader module 26 mounted within the ATM 10, and the cash delivery slot 24 aligns with a cash dispense module 28 mounted in a safe (not shown) within the ATM 10.

The ATM 10 also includes an internal journal printer module 30 for recording all transactions executed by the ATM 10, a dial-up modem 32 for communicating with the remote transaction host (not shown) that authorizes transactions, and an ATM controller module 34 for controlling the operation of the modules (18, 20, 26, 28, 30, 32) within the ATM 10. An internal bus 36 for securely conveying data interconnects all of the modules within the ATM 10.

Figure 2:
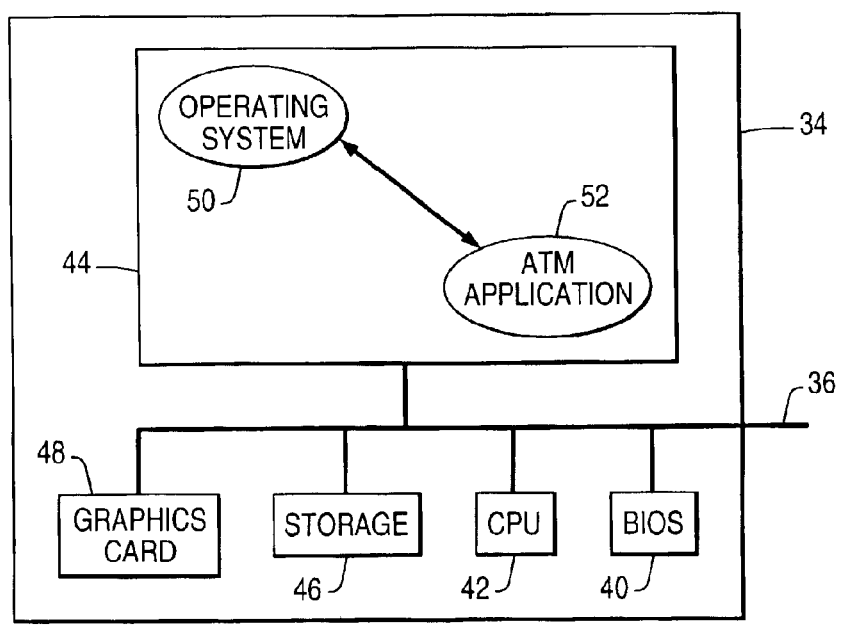
FIG. 2 is a block diagram showing a part (the controller) of the terminal of FIG. 1 in more detail.

The ATM controller 34 is illustrated in more detail in FIG. 2, and comprises a BIOS 40 stored in non-volatile memory, a microprocessor 42 and associated main memory 44, storage space 46 in the form of a magnetic disk drive, and a video adapter 48 in the form of a graphics card for controlling the display module 18.

In use, the microprocessor 42 loads an operating system kernel 50 and control means 52 (in the form of an ATM application program) into the main memory 44.

The ATM application program 52 controls the operation of the ATM 10. In particular, the ATM application program 52: provides the sequence of screens used in each transaction (referred to as the transaction flow); and monitors the condition of each module within the ATM 10 (referred to as state of health monitoring)

An example of a typical transaction at the ATM 10 will now be described with reference to FIGS. 3A to 3D, which illustrate the sequence of screens presented to the user 12 on display module 18 during a transaction.

When the user 12 approaches the ATM 10 he/she is presented with an attract screen 60a (FIG. 3A) on display 18 inviting him/her to insert a card.

After inserting a card, the user 12 is presented with a screen 60b (FIG. 3B) inviting him/her to enter a personal identification number (PIN) or an extended authorization code comprising a PIN and a cash withdrawal amount. This enables a user either:

(1) to enter his/her PIN only and then navigate through a sequence of screens to create a transaction, or (2) to enter an authorization code comprising a PIN and a transaction code so that the ATM proceeds immediately to authorize the transaction entered via the authorization code.

Figure 4A:
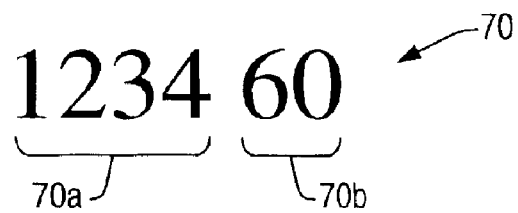
FIGS. 4A to 4C are examples of three different authorization codes for use with the terminal of FIG. 1.

In this example, the user 12 enters on keypad 20 an authorization code 70, as illustrated in FIG. 4a, comprising two fields: a PIN field 70a and a transaction field 70b, and then presses a "PROCEED" key on the keypad 20.

The PIN field 70a comprises the first four digits, in this embodiment the numbers "1234", and the transaction field 70b comprises the digits following the PIN field 70a. In this embodiment, the transaction field 70b may be two or three digits long. It will be appreciated, however, that the length of the transaction field 70b will be affected by the amount of cash that an owner of the ATM allows a user to withdraw, and perhaps also by the currency used (for example, more digits may be required to indicate the amount of cash required in Japanese Yen than in U.S. dollars).

In the example given in FIG. 4A, there are two digits in the transaction field 70b, "60", which represent 60 pounds sterling to be withdrawn from the user's account.

A secure processor (not shown) within the encrypting keypad 20 analyses the authentication code 70 to separate the digits in the PIN field 70a from the digits in the transaction field 70b, and creates a PIN block comprising an encrypted version of the PIN, and an indication of the amount to be withdrawn.

The ATM application 52 appends the user's account details to this PIN block to create a transaction request, and sends the transaction request to the remote transaction host (not shown) for authorization. The transaction request is identical to a transaction request generated when a user enters a PIN at one screen, then selects a transaction at another screen, then enters a transaction amount at another screen. Thus, the remote transaction host (not shown) is unaware of whether the transaction request was generated in a conventional manner (by the user navigating through multiple screens) or via the authorized code entered at a single screen.

If the transaction host (not shown) authorizes the transaction, then the ATM application 52 presents a screen 60c (FIG. 3C) inviting the user to remove his/her card. Once the user has removed his/her card, the ATM application 52 presents a screen 60d (FIG. 3D) inviting the user to remove the requested cash.

Figure 3A:
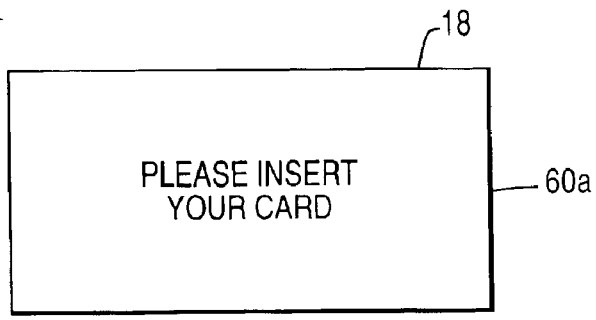
FIGS. 3A to 3D illustrate a sequence of screens presented to a user of the terminal of FIG. 1 during a transaction.
Figure 3B:
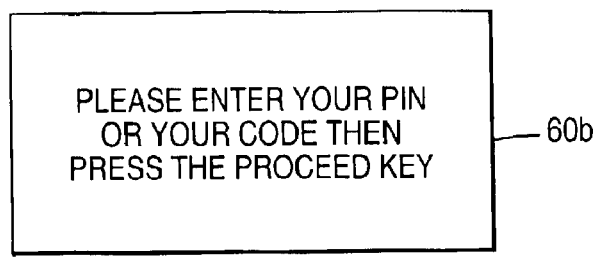
Figure 3C:
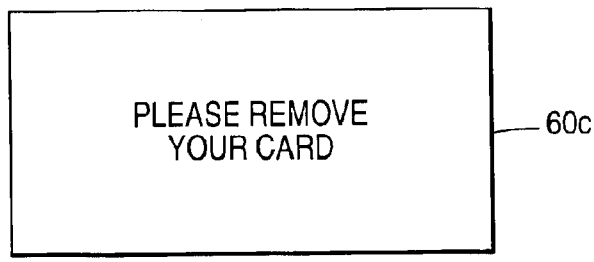
Figure 3D:
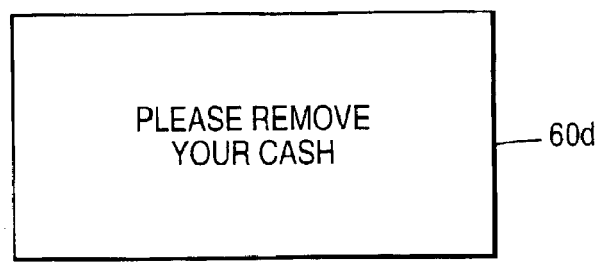

Once the cash has been removed, the ATM application 52 reverts to the attract screen 60a (FIG. 3A).

Figure 4B:
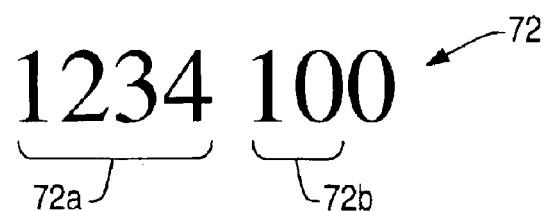
Figure 4C:
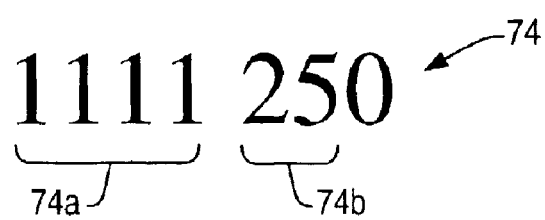

It will be appreciated that although a user's PIN remains constant between transactions, a user's authorization code may change between transactions because the transaction field depends on the amount a user desires to transact, as illustrated in FIGS. 4B and 4C.

FIG. 4B shows an authorization code 72 where the user instructs the ATM 10 to dispense one hundred pounds. In FIG. 4B, the PIN field 72b is identical to the PIN field in FIG. 4A because it is the same user; however, the transaction fields 72b,70b are different.

In FIG. 4C, a different user is executing a transaction, so the authorization code 74 has a different PIN field 74a to that of authorization codes 70 and 72. Furthermore, the transaction field 74b is also different to transaction fields 70b and 72b because transaction field 74b relates to withdrawal of two hundred and fifty pounds.

Various modifications may be made to the above described embodiment within the scope of the invention, for example, in other embodiments, a user's identification token (which is a card in the above embodiment) may indicate whether the token holder prefers to use an authorization code including a transaction field, or a PIN. If the token indicates that the holder prefers to enter a PIN and then a transaction amount, then a screen may be presented having text inviting the user to enter a PIN, although the user may be able to enter an authorization code instead. If the token indicates that the token holder prefers to enter an authorization code including a transaction amount, then a screen may be presented having text inviting the user to enter an authorization code including a transaction amount, although the user may be able to enter a PIN instead so that the user would be presented with a transaction type screen inviting the user to select a transaction to be executed.

In other embodiments, the secure device may allow a user to use an authorization code to execute a different transaction, for example, cash deposit, check deposit, mixed check and cash deposit, money order printing, bill payment, cellular telephone pre-payment, ticket purchasing, or such like.

In other embodiments, the secure device may be a kiosk or some other type of networked computing device.

In other embodiments, a confirmation screen may be presented to a user to allow the user to confirm the amount to be transacted.

In other embodiments, the authorization code may not be entered as a single code, but may be entered in a plurality of stages. For example, the PIN field may be entered first, then the transaction field may be entered; however, the different parts of the code would not be entered in response to different screens, or other prompts, being presented to the user.

In other embodiments, a user may be provided with a different PIN that is associated with a fixed transaction; so that whenever a user enters that PIN, the fixed transaction (for example, withdraw fifty pounds sterling) is authorized.

Although digits have been used in the above examples, an authorization code may comprise characters other than digits, for example, letters, punctuation marks, or other special characters.

What is claimed is:

1. An authorization code for allowing a user to conduct a transaction, the code comprising:
   a user identification field having a number of characters which have been assigned to a user to allow identity of the user to be verified; and
   a transaction field relating to a transaction to be executed and having a number of characters which together with the characters in the user identification field form a sequence of characters such that both the identity of the user is verified and the transaction is executed when the sequence of characters is entered by the user in a single step.

2. An authorization code according to claim 1, wherein the characters contained in the user identification field forms a first part of the sequence of characters, and the characters contained in the transaction field forms a last part of the sequence of characters.

3. An authorization code according to claim 2, wherein the characters contained in the transaction field relate to a cash withdrawal transaction.

4. An authorization code according to claim 3, wherein the first four characters of the sequence of characters are digits forming a personal identification (PIN) number which has been assigned to the user to allow identity of the user to be identified, and the last three characters of the sequence of characters are digits indicating an amount of cash to be withdrawn in a local currency in the cash withdrawal transaction.

5. A method of enabling a user to conduct a transaction, the method comprising:
   receiving from the user in a single step an authorization code comprising (i) a user identification field having a number of characters which have been assigned to the user to allow identity of the user to be verified, and (ii) a transaction field relating to a transaction to be executed and having a number of characters which together with the characters in the user identification field form a sequence of characters;
   operating on the characters contained in the user identification field portion of the sequence of characters to verify identity of the user; and
   operating on the characters contained in the transaction field portion of the sequence of characters to execute the transaction for an amount indicated by the characters contained in the transaction field portion of the sequence of characters.

6. An automated teller machine (ATM) comprising:
   a cash dispenser for dispensing cash to an ATM customer;
   an encrypting keypad which receives a single authorization code from an ATM customer; and
   a processor which parses the single authorization code into (i) an ATM customer identification field having a number of characters which have been assigned to the ATM customer to allow identity of the ATM customer to be verified, and (ii) an ATM transaction field relating to an ATM cash withdrawal transaction and having a number of characters which represent an amount of cash to be withdrawn and which together with the characters in the ATM customer identification field form a sequence of characters, wherein (i) the identity of the ATM customer is verified based upon the characters contained in the ATM customer identification field portion of the sequence of characters and (ii) the cash dispenser is commanded to dispense to the ATM customer a cash amount based upon the characters contained in the ATM transaction field portion of the sequence of characters, when the ATM customer enters the sequence of characters in a single step via the encrypting keypad.

7. A self-service terminal for allowing a self-service user to conduct a self-service transaction, the self-service terminal comprising:
   means for receiving from the user in a single step an authorization code comprising (i) a user identification field having a number of characters which have been assigned to the user to allow identity of the user to be verified, and (ii) a transaction field relating to a self-service transaction and having a number of characters which together with the characters in the user identification field form a sequence of characters; and
   means for (i) operating on the characters contained in the user identification field portion of the sequence of characters to verify of the user, and (ii) operating on the characters contained in the transaction field portion of the sequence of characters to execute the self-service transaction.

* * * * *

UNITED STATES PATENT AND TRADEMARK OFFICE
CERTIFICATE OF CORRECTION

PATENT NO. : 6,923,371 B2 Page 1 of 1
DATED : August 2, 2005
INVENTOR(S) : Goodfellow, Janet E.

It is certified that error appears in the above-identified patent and that said Letters Patent is hereby corrected as shown below:

<u>Column 6,</u>
Line 58, after "verify" insert -- indentity --.

Signed and Sealed this

Eighteenth Day of April, 2006

JON W. DUDAS
*Director of the United States Patent and Trademark Office*